(12) United States Patent
Ng et al.

(10) Patent No.: US 8,380,548 B2
(45) Date of Patent: Feb. 19, 2013

(54) METHOD FOR MANAGING INTELLECTUAL PROPERTY

(76) Inventors: So-ling Carmen Ng, Arlington, VA (US); Dexter Kam Chin, Singapore (SG)

( * ) Notice: Subject to any disclaimer, the term of this patent is extended or adjusted under 35 U.S.C. 154(b) by 1016 days.

(21) Appl. No.: 12/030,887

(22) Filed: Feb. 14, 2008

(65) Prior Publication Data

US 2008/0201187 A1 Aug. 21, 2008

Related U.S. Application Data

(60) Provisional application No. 60/889,937, filed on Feb. 15, 2007, provisional application No. 60/889,936, filed on Apr. 24, 2007.

(51) Int. Cl.
*G06F 17/50* (2006.01)

(52) U.S. Cl. ............... 705/7; 705/310; 705/36 R; 705/1; 707/104.1; 707/3

(58) Field of Classification Search ............ 705/7, 36 R, 705/310, 1, 10; 707/104.1, 3
See application file for complete search history.

(56) References Cited

U.S. PATENT DOCUMENTS

| | | | | |
|---|---|---|---|---|
| 2003/0172020 A1* | 9/2003 | Davies et al. | .................. | 705/36 |
| 2003/0187874 A1* | 10/2003 | Peschel et al. | ............. | 707/104.1 |
| 2007/0136373 A1* | 6/2007 | Piasecki et al. | ............. | 707/104.1 |
| 2009/0254572 A1* | 10/2009 | Redlich et al. | .................. | 707/10 |
| 2009/0307577 A1* | 12/2009 | Lee | .............................. | 715/226 |
| 2010/0094763 A1* | 4/2010 | Frank et al. | .................... | 705/310 |

* cited by examiner

*Primary Examiner* — Vanel Frenel
(74) *Attorney, Agent, or Firm* — Horizon IP Pte Ltd

(57) ABSTRACT

A search algorithm is provided in an intellectual property (IP) management system for determining an optimal IP portfolio. The search algorithm generates and evaluates a plurality of IP portfolios using objective functions to find an IP portfolio that most nearly optimizes at least one goal. The goals to be optimized includes, for example, minimizing the costs of procuring the IP assets or maximizing the growth potential of the IP portfolio.

25 Claims, 7 Drawing Sheets

Textual Output of Optimal Patent Portfolio

|  | Asia | Europe | United States |
|---|---|---|---|
| Networking | 12 | 17 | 10 |
| Memories | 17 | 11 | 21 |
| Microcontroller | 22 | 29 | 14 |
| Semiconductor Processing | 14 | 10 | 17 |
| Testing | 12 | 17 | 10 |
| Computer Architecture | 19 | 15 | 20 |
|  |  |  |  |
| Projected Revenue | $2,000,000,000 |  |  |
| Projected Costs | $1,500,899 |  |  |
| Risk Factor | 0.4 |  |  |
| Diversity Factor | 0.6 |  |  |

Fig. 5

General Information
- Submission Date
- Title
- Inventors
- Technology
- Expected Evaluation Date
- Evaluation Date Evaluation
- Rating
- Decision
- Comments Inventor's Remuneration
- Amount
- Payment Date Filing Jurisdiction
- Assigned Attorney/Firm
- Expected Completion Date
- Filing Date
- 1 Year Date
- Action Received
- Client Report Date
- Response Due Date
- Response Date
- Client Report
- Patent Grate Date

Fig. 7

METHOD FOR MANAGING INTELLECTUAL PROPERTY

CROSS-REFERENCE TO RELATED APPLICATIONS

This application claims the benefit of U.S. Provisional Application No. 60/889,937 entitled "System & Method for Docketing and Portfolio Management", filed Feb. 15, 2007 and U.S. Provisional Application No. 60/889,936 entitled "System & Method for Managing Intellectual Property", filed Apr. 27, 2007. The disclosure of both provisional applications is hereby incorporated by reference in its entirety.

FIELD OF THE INVENTION

The present invention relates generally to management of intellectual property.

BACKGROUND OF THE INVENTION

Intellectual property (IP) assets are very valuable in many fields of business. They have formed a major part of the group of intangible property assets which have gained increasing importance for corporations. Intellectual property comprises patents, trademarks, service marks, copyrights, trade secrets and other forms of proprietary knowledge.

Creating, developing and managing intellectual property to fully exploit its potential value has become a main goal for many IP rights owners, particularly large corporations. Current IP portfolio systems are typically managed manually and day-by-day by responsible IP personnel. The IP portfolio manager reviews the invention disclosure and rates the disclosure based on advice of team members. The rating will determine if the disclosure is to be filed as a patent application, closed (if no further action is deemed necessary) or published as a defensive publication. Such decisions are typically ad-hoc and prone to personal biases of the decision maker.

From the foregoing discussion, it is desirable to provide an improved system that can manage and optimize an IP portfolio based on objective valuation.

SUMMARY OF THE INVENTION

An implementation is provided for facilitating management of a portfolio of intellectual property (IP) assets. It further facilitates management of an IP portfolio employing results from an informed search algorithm, such as a genetic algorithm. In one aspect of the invention, a method for managing a portfolio of IP assets comprises the step of generating an initial population of genomes, wherein a genome comprises a plurality of genes, a genome represents a portfolio of IP assets. The method further comprises the step of modifying the population using a genetic algorithm until a terminating condition is satisfied to obtain at least one genome representing an optimal IP portfolio that optimizes at least one goal. At least one recommendation for future actions is automatically generated based on the optimal IP portfolio.

A method for managing a portfolio of IP assets in another aspect of the invention discloses the step of receiving user information and analytical data, wherein the user information comprises a plurality of goals. An optimal IP portfolio is searched based on the user information and analytical data using an informed search algorithm, the optimal IP portfolio optimizes at least one goal. The method further includes processing the optimal IP portfolio to generate at least one recommendation for future actions.

In another aspect of the invention, a system for managing a portfolio of IP assets is presented. The system includes an input unit for receiving, processing, and storing user information and market information. The user information includes a plurality of goals. A search unit comprises a search algorithm that searches for an optimal IP portfolio that optimizes at least one goal is included. The system further comprises a presentation device which is configured for presenting results based on the optimal IP portfolio.

In yet another aspect of the invention, a system for managing a portfolio of IP assets is disclosed. The system comprises an input unit and a search unit. The input unit is configured for receiving user information and market information, wherein the user information includes a plurality of goals. The search unit is configured to receive the user information and market information from the input module and uses a genetic algorithm to generate an optimal IP portfolio that optimizes at least one goal. The genetic algorithm comprises determining fitness values of genomes by applying at least one objective fitness function to the genomes, wherein a genome represents an IP portfolio, an objective fitness function corresponds to a goal and a fitness value represents degree to which the goal is satisfied. The parent genomes are selected for reproduction based on their fitness values and new child genomes are derived from the parent genomes. The genetic algorithm further includes replacing the parent genomes with the child genomes.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 5 shows a textual output of an optimal patent strategy in accordance with one embodiment of the invention;

FIG. 7 shows a list of information or data for managing IP in accordance with one embodiment of the invention.

DETAILED DESCRIPTION OF THE INVENTION

The present invention relates generally to a method and system for generating an optimal Intellectual Property (IP)

portfolio. IP includes, but is not limited to, patents (including plant patents, design patents, utility patents and petty patents), patent applications, international patent applications, industrial designs, trademarks, service marks, copyrights, licenses, trade secrets, domain names, confidential information owned by company not publicly known, and any other aspect of IP that gives a company a competitive edge or otherwise enhances the value of a company.

Figure 1:
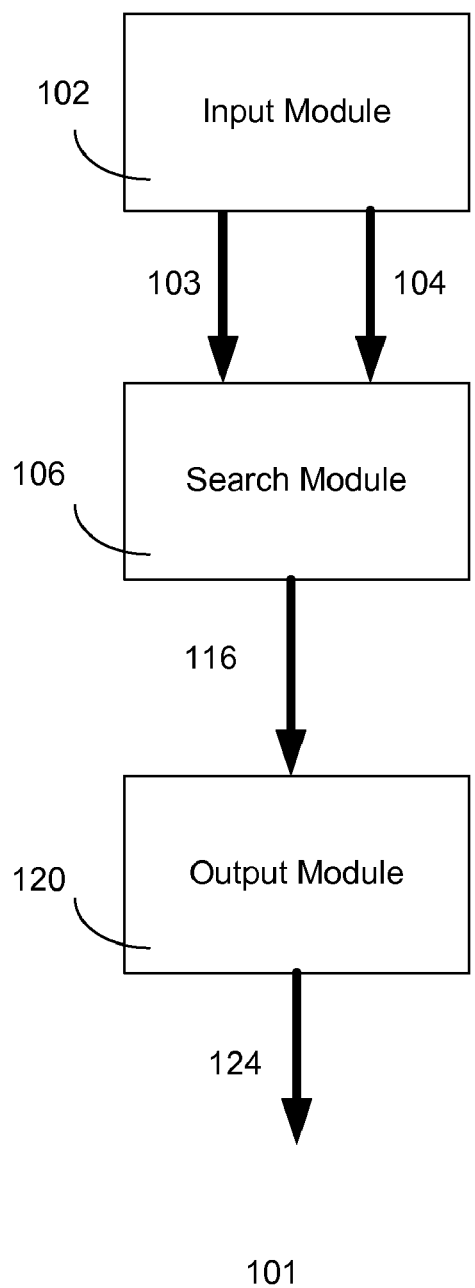
FIG. 1 shows a system for managing IP in accordance with one embodiment of the invention.

FIG. 1 shows a system for managing IP in accordance to one embodiment of the invention. An IP management system 101 includes, in one embodiment, an input module 102, a search module 106 and an output module 120. Other configurations are also useful. The input module 102 provides user information 103 and analytical data 104 to the search module 106. The search module searches for an optimal IP portfolio 116 based on the user information and analytical data. The output module 120 processes the optimal IP portfolio and displays the results 124.

The input module comprises, in one embodiment, a user server that receives, processes and stores input from the user. The user can interact with the IP management system using client software which may be running within a browser application or a standalone desktop application on the user's personal computer or mobile device. The client software communicates with the user server. The user may provide information regarding the goals to be optimized, such as preferences regarding diversification, expected revenue, budget requirements, initial IP portfolio, target market segments, and other useful information. In addition, the user may provide information about his or her company. This information may be saved in one or more files in the input module.

The goals to be optimized can vary depending on the patent strategy and business goals of the IP portfolio owner. Such goals include, for example, maximizing diversification, maximizing revenue potential, minimizing risks and minimizing costs. The goals can be ranked in accordance with the level of importance, based on the nature of the business. For example, a young startup company born out of ground-breaking inventions should allocate significant resources to obtain protection for the core technology. Diversification may not be such an important factor to such start-up companies, as compared to growing companies, and may be assigned a lower weight than for example, the risk-minimization goal.

The initial IP portfolio can be the portfolio of IP assets which the user's company currently owns. The initial IP portfolio can describe, for example, the number of issued patents, patent applications or a combination of both filed in different countries or jurisdictions. It can also describe the types of technologies that these issued patents or patent applications protect. Technology fields can be classified according to the U.S. patent and Trademark Office (USPTO) technology classes. Other types of classification systems, such as the World Intellectual Property Organization (WIPO) International Patent Classification system, can also be used.

In one embodiment, the input module further comprises a database server. The database can be a Relational Database Management System (RDMS), such as a Microsoft SQL-Server, Oracle or other suitable systems. In one embodiment, the input module serves to validate, refine and process raw source data into analytically useful data. The raw source data may be obtained periodically from, for example, data vendors or commercial databases. The input module provides the search module 106 with access to the validated analytical data 104.

The analytical data 104 comprises, in one embodiment, IP market information, such as cost information and market information or indices. Cost information includes, for example, the typical costs of procuring, maintaining or enforcing IP assets in different market segments. The costs include, but are not limited to, professional services fees and official government fees such as filing fees, issue fees, maintenance fees, search fees and examination fees in different jurisdictions or countries. Market information includes, for example, objective market indices that describe the competitive environment of a particular technology or jurisdiction. Such objective market indices can be obtained from public sources such as the Global Competitiveness Report published annually by the World Economic Forum, or computed by consulting skilled professionals.

Based on the user input data 103 and the analytical data 104, the search module 106 searches for an optimal IP portfolio 116 that optimizes at least one goal, after evaluating a number of possible solutions. In one embodiment, the search module comprises a search algorithm, such as an informed search algorithm that uses a heuristic to reduce the search space and therefore, increases the efficiency of the search. The informed search algorithm comprises, for example, an evolutionary algorithm (e.g., genetic algorithm), a swarm-based algorithm (e.g., particle swarm optimization and ant colony optimization) or a memetic algorithm. Other types of search algorithms are also useful.

The output module 120, in one embodiment, processes and displays the optimal IP portfolio 116. The optimal IP portfolio can be used to, for example, aid the IP manager to manage IP assets in the company, or in making strategic filing and investment decisions. The output module can also automatically provide the user with reports, recommendations or indicators regarding the projected returns on the optimal IP portfolio. For example, based on the user's company's initial and optimal IP portfolios, the output module may provide advice or make recommendations for future actions, such as whether or not to file, acquire or maintain legal protection for a specified invention, where to file the patent application, or which market segment to focus developmental efforts in.

Figure 2:
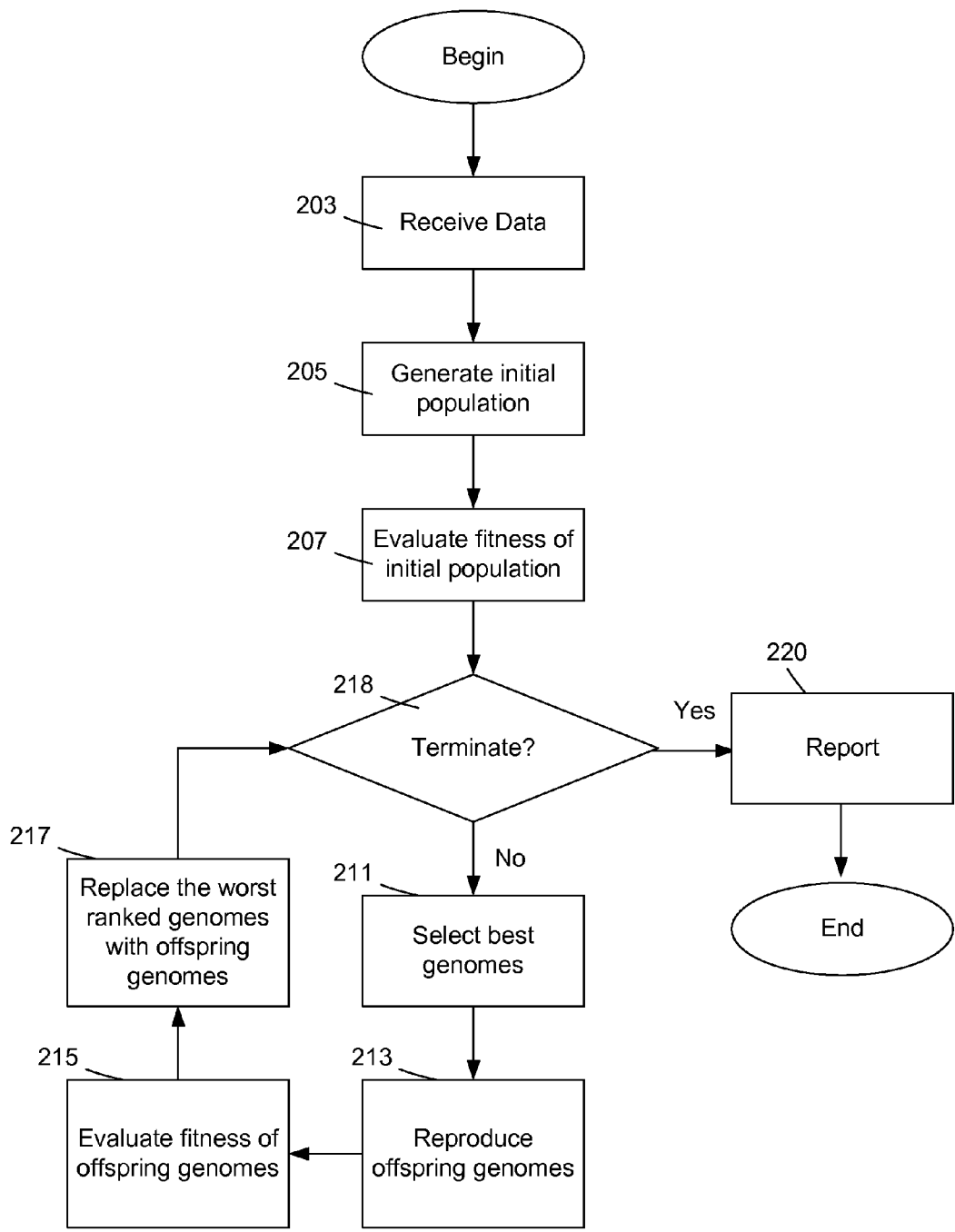
FIG. 2 shows a flowchart illustrating the operation of a genetic algorithm in accordance with one embodiment of the invention.

FIG. 2 depicts a flowchart illustrating the operation of a genetic algorithm in the search module in accordance with one embodiment of the invention. At step 203, the genetic algorithm begins by receiving user information and analytical data. The initial genome population is then generated at step 205. The genome population comprises a plurality of genomes (e.g., 100). The number of genomes is determined by the resources (e.g., computing power) that are available, and the efficiency desired. Preferably, the number of genomes is selected to enable the genetic algorithm to efficiently and thoroughly search for the optimal IP portfolio. In one embodiment, the genome is represented by a vector data structure. One, two or multiple-dimensional vectors can be used. Other types of data structures or implementations are also useful. A genome comprises a plurality of genes (i.e. alleles). A genome represents an IP portfolio. A gene corresponds to a segment of the IP portfolio.

Figure 3:
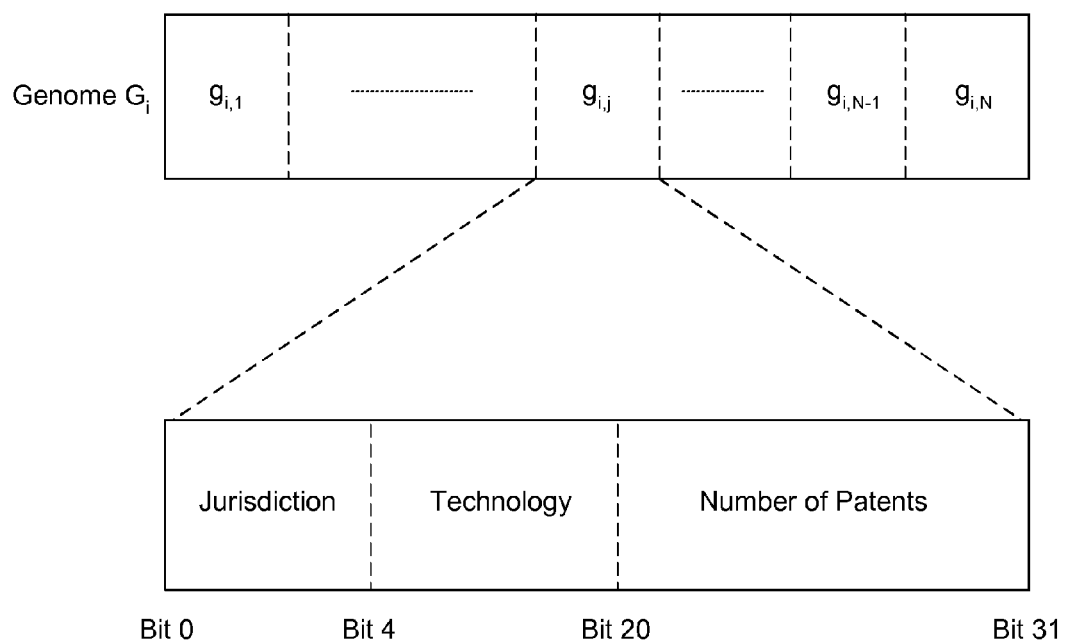
FIG. 3 shows a genome in accordance with one embodiment of the invention.

FIG. 3 shows a genome $G_i$ in accordance with one embodiment of the invention. A genome population comprises of M number of genomes $G_1, \ldots G_i, \ldots G_M$, wherein M is a positive integer. A genome $G_i$ comprises N number of genes $g_{i,1}, \ldots g_{i,j}, \ldots g_{i,N}$, wherein N is a positive integer. In one embodiment, the number of genes N is determined by the number of market segments in an IP portfolio to be analyzed.

In one embodiment, each gene $g_{i,j}$ represents the number of patents filed in a market segment. The market segment can be defined by, for example, the technology area or the jurisdiction. In one embodiment, a jurisdiction is defined by the state (e.g., California, New York), country (e.g., U.S., China, Singapore) or region (e.g., Europe, Asia). In one embodiment of the invention, a gene represents the number of patents filed in a particular jurisdiction and pertaining to a particular technology. Alternatively, a gene can represent the number of patents filed in a particular technology field. In yet another embodiment, a gene represents the number of patents filed in a particular jurisdiction. A combination of different types of genes or other types of configurations are also useful.

A gene can be represented by a 32-bit word, such as the one shown in FIG. 3. Words of other lengths, such as 16, 64, and 124 bits, are also useful. In one embodiment, 4 bits (0 to 3) are used to represent the jurisdiction field, 16 bits (4 to 19) are used to represent the technology field and 12 bits (20 to 31) are used to represent the number of patents filed. Other types of bit configurations are also useful. For example, 8 bits (0 to 7) can be used to represent the technology field and 8 bits (8 to 15) can be used to represent the number of patents.

In one embodiment, the jurisdiction field contains an unsigned integer X that represents the country that the patents are filed in. A look-up table, such as the one shown in Table 1, can be used to match the integer X to the country.

TABLE 1

| Country | X |
|---|---|
| United States | "0001" (1) |
| China | "0010" (2) |
| Germany | "0011" (3) |
| Japan | "0100" (4) |
| France | "0101" (5) |
| United Kingdom | "0110" (6) |

Likewise, the technology field contains an unsigned integer Y that can be mapped to the technology area using, for example, a lookup table. Alternatively, the integer Y can be mapped to a technology area using a standard classification system, such as the U.S. patent Classification System (USPC). For example, following the USPC, (Y=705 or "0000 0010 1100 0001") represents the data processing technology class. Other types of classifications systems, such as the International Patent Classification (IPC) system, the Japanese Patent Office File Index, the European Patent Classification (ECLA) system or the Derwent Classification system, can also be used. The technology field (e.g., 16 bits) can be subdivided to represent a main class (e.g., 10 bits) and a sub-class (e.g., 6 bits), in accordance with the classification system. Other ways of representing the technology area are also useful.

Referring back to FIG. 2, the genomes are randomly initialized to form the initial population at step 205. In one embodiment, the genomes are initialized by randomly assigning 0 or 1 to each bit in the genome with equal probability. In one embodiment, the population is generated randomly, covering the entire range of possible solutions. In another embodiment, the population is "seeded" where optimal solutions are likely to be found. Other methods of improving the overall quality of search are also useful.

Subsequently, the fitness of each genome is evaluated at step 207. The fitness is determined by using at least one objective fitness function. The fitness function measures how well the genome optimizes or satisfies the specified objective. The number of fitness functions depends on the number of goals K to be achieved. Each fitness function produces a fitness output value fk for the specified goal, where k is a positive integer. The fitness value $f_k$ is preferably normalized to a unitless value wherein $0 \leq f_k \leq 1$, to allow for comparison between the different fitness values. Further, the fitness value is preferably standardized, wherein the optimal value is 0 and the worst value is 1. The fitness values may be weighted according to the relative importance of the goals, using a weight factor $w_k$ wherein $0 \leq w_k \leq 1$. To determine the fitness F of each genome, the fitness values corresponding to the various fitness functions are summed as follows:

$$F = \sum_{k=0}^{k=K-1} w_k f_k$$

where

F is the fitness of the genome;

$f_k$ is the normalized, standardized fitness output value for each objective;

$w_k$ is the weight for each goal; and

K is the number of goals.

The goals generally depend on the kind of IP strategy that the technology firm adopts. Some firms use their IP to improve their competitive position, generate revenue and/or improve their access to financing. Some objectives may be more important to the firm than others, depending on its nature, size, stage of development or business model. For example, a young firm born of a single ground-breaking invention may want to allocate significant resources to obtain protection for their core technology. The relatively high cost associated with obtaining proper IP protection for certain key technology needs to be balanced against the probability that obtaining such protection could prove vital to the company's attractiveness to investors, ability to secure market share and generate future revenue stream for further growth. Therefore, minimizing cost may be the most important goal, followed by maximizing protection for core technology areas. Maximizing the number of patents may be the least important goal, since cost is generally of the greatest concern for such young companies.

For illustration purposes, some goals are listed below to show the manner in which the fitness of the genomes may be computed. These goals and fitness functions are merely exemplary, and can include other goals or fitness functions not described herein.

Maximizing the Number of Patents

The fitness value $f_k$ may be calculated to maximize the number of patents that can be procured within a specified budget. In one embodiment, each allele specifies the number of patents ($X_j$) to be filed within a specified technology or jurisdiction. The fitness value may be calculated, for example, by adding the $X_j$ values of all the alleles in a genome and normalizing the result by using a normalization factor. The normalization factor may be, for example, the maximum number of patents ($X_{max}$) obtainable within a specified budget (B). $X_{max}$ may be calculated, in one embodiment, by dividing a specified budget (B) with the average cost of procuring a patent. Other normalization methods may also be used. The following equation illustrates how the fitness of the genome may be calculated:

$$f_k = \left| 1 - \frac{1}{X_{max}} \sum_{k=0}^{N-1} X_j \right|$$

where $f_k$ is the fitness of the genome in optimizing the objective of maximizing the number of patents;

$X_{max}$ is the maximum number of patents that can be procured using a specified budget;

$X_j$ is the number of patents stated by each allele of the genome; and

N is the number of alleles in the genome.

Maximizing Protection in Core Technological Areas

In one embodiment, the firm may specify certain areas of technology that it wants strong protection. This is done, for example, when the firm adopts a defensive strategy: to prevent copying, prevent other firms from patenting (i.e. blocking) and prevent lawsuits in core technology areas. In one embodiment, the search module receives as input the specified technology index indicating the core technology area $T_h$. More than one core technology area may be specified.

For each core technology area, the fitness value $f_{k,h}$ may be calculated, for example, by adding the number of patents ($X_j$) of all the alleles in a genome directed to the specified technology area. The resulting sum may be normalized by using a normalization factor. The normalization factor can be, for example, the maximum number of patents ($Y_h$) obtainable within a specified budget ($B_h$) for a particular technology area. $Y_h$ may be calculated, in one embodiment, by dividing a specified budget ($B_h$) allocated for the specified technology area with the average cost of procuring a patent. Other normalization methods may also be used. The following equation illustrates how the fitness of the genome may be calculated:

$$f_{k,h} = \left| 1 - \frac{1}{Y_h} \sum_{j=0}^{N-1} X_{j,h} \right|$$

where $f_{k,h}$ is the fitness of the genome in optimizing the objective of maximizing the number of patents in a particular core technology area $T_h$;

$Y_h$ is the maximum number of patents that can be procured using a specified budget allocated for a particular core technology area $T_h$;

$X_{j,h}$ is the number of patents stated by each allele of the genome allocated to the particular core technology area $T_h$; and N is the number of alleles in the genome.

Where more than one technology area is specified, the fitness value $f_k$ of the genome can be calculated by obtaining the product of all the $f_{k,h}$ values.

Maximizing Growth Potential of Patent Portfolio

In one embodiment, the firm may want to maintain an international patent portfolio. The patent portfolio can be optimized by filing more patents in countries or technology areas with the highest growth potential. Various factors may affect the growth potential of IP in a certain jurisdiction or technology. For example, factors such as intellectual property protection and enforcement, capacity for innovation, technological readiness or market efficiency may affect the competitiveness of doing business in a particular jurisdiction, which in turn affects the value of procuring an IP asset in that jurisdiction.

Market indices (S) can provide a useful measure of the potential strength of a patent in a particular jurisdiction or industry. In one embodiment, the strength of the patent asset in a particular jurisdiction or technology area is represented by an objective market index derived from market data or other objective factors. In another embodiment, the index can be a subjective index based on rankings by professionals with the relevant experience. The index S can be provided on a scale of 0 to 10, or similar scale, wherein the higher the value, the greater the potential strength of the IP assets acquired in that jurisdiction or technology. One or more indices can be used. In one embodiment, objective market indices comprise jurisdiction indices ($S_c$), technology indices ($S_t$), or a combination of both. Other types of indices are also useful, alone or in combination.

In one embodiment of the invention, the jurisdiction index describes the environment for protection or enforceability of IP rights in a particular country or the country's technological readiness. Other types of jurisdiction indices are also useful, alone or in combination. In one embodiment, the technology objective index describes the market demand for a particular technology. Other types of technology indices are also useful. The objective market indices can be created with indicators such as companies' research and development spending, the creativity of its scientific community, personal computer and internet penetration rates. In one embodiment, the market indices are obtained from public sources, such as the Global Competitiveness Report published annually by the World Economic Forum. Alternatively, the objective index can be determined by consulting skilled professionals, such as economists, market analysts, patent practitioners, technologists, attorneys or others with relevant experience to rank the jurisdiction or technology according to potential strength of IP acquired in that area.

In one embodiment, the fitness value $f_{kj}$ of each allele may be calculated, for example, by multiplying the number of patents ($X_j$) specified by each allele in a genome with the objective index (S) for the specified technology area and/or jurisdiction. The fitness values of all the alleles are added and normalized using a normalization factor. The normalization factor can be, for example, the maximum value of an objective index ($S_{max}$). Other normalization methods may also be used. The following equation illustrates how the fitness of the genome may be calculated:

$$f_k = \left| 1 - \frac{1}{S_{max}} \sum_{j=0}^{N-1} S_c S_t X_{j,h} \right|$$

where $f_k$ is the fitness of the genome in optimizing the objective of maximizing the potential of the patent portfolio;

$S_{max}$ is the maximum value of the objective index;

$S_c$ is the objective index of the jurisdiction stated by the allele;

$S_t$ is the objective index of the technology area stated by the allele; and

N is the number of alleles in the genome.

Minimizing Cost of Procuring Legal Protection

The fitness value $f_k$ may be calculated to minimize the cost of procuring patent protection. In one embodiment, each allele specifies the number of patents ($X_j$) to be filed within a specified technology or jurisdiction. The cost ($C_j$) of obtaining the number of patents specified in the patent can be calculated by multiplying the number of patents ($X_j$) with the average cost of preparing and filing the patents in the specified technology or jurisdiction. In one embodiment, the average costs of procuring patents in different countries and/or technology areas can be stored in memory and used for computing the average costs $C_j$.

The fitness value may be calculated, for example, by adding the costs for all the alleles and normalizing the result by using a normalization factor. The normalization factor may be, for example, the specified budget (B). Other normalization methods may also be used. The following equation illustrates how the fitness of the genome may be calculated:

$$f_k = \left| \frac{1}{B} \sum_{j=0}^{N-1} C_j \right|$$

where $f_k$ is the fitness of the genome in optimizing the objective of minimizing cost;

B is the budget allocated for procuring patents;

$C_j$ is the cost of procuring $X_j$ patents stated by each allele of the genome; and N is the number of alleles in the genome.

After the fitness (F) of each genome is evaluated, the genomes are selected at step 211 to breed offspring genomes. The fitter genomes are typically more likely to be selected for reproduction. Various types of selection functions may be used. The selection may be carried out, for example, by roulette wheel selection, tournament selection or any other types of suitable algorithms. Most functions are designed such that a small proportion of the less fit genomes are selected to prevent premature convergence on poor solutions.

Reproduction at step 213 is typically carried out by the methods of crossover and mutation of selected "parent" genomes. Various types of crossover techniques can be used to produce the offspring genomes from the parent genomes. For example, crossover techniques such a one-point crossover, two-point crossover, cut-and-splice crossover, uniform crossover and half uniform crossover, are well-known in the art. In one embodiment, a one-point crossover technique is used. A crossover point in a pair of parent genomes is selected. All data beyond that point is swapped between the two parent genomes, resulting in two offspring genomes. After the offspring genomes are produced, they are mutated to maintain genetic diversity and avoid a local minima that will produce a sub-optimal solution. This can be done, for example, by selecting an arbitrary bit in the offspring genome and toggling the value from 1 to 0 or vice versa.

By using the methods of crossover and mutation, new genomes are created which shares many of the characteristics of its "parents". The fitness of each offspring genome is evaluated at step 215. The offspring genome replaces the least fit genome in the population at step 217. Other types of replacement strategies are also useful. This process continues until a terminating condition is reached at step 218.

Different types of terminating conditions can be used. In one embodiment, the terminating condition is one of the following: (1) a pre-determined number of generations is reached; (2) the allocated budget is reached; or (3) the highest ranking patent portfolio's fitness is reaching or has reached an optimal level such that successive iterations no longer produce better results. Other types of terminating conditions can also be used, alone or in combination. For example, the process may be terminated when a patent portfolio is found that satisfies a minimum criteria, when manual inspection reveals that further iterations no longer produce better results or when the allocated computing time is reached.

Figure 4:
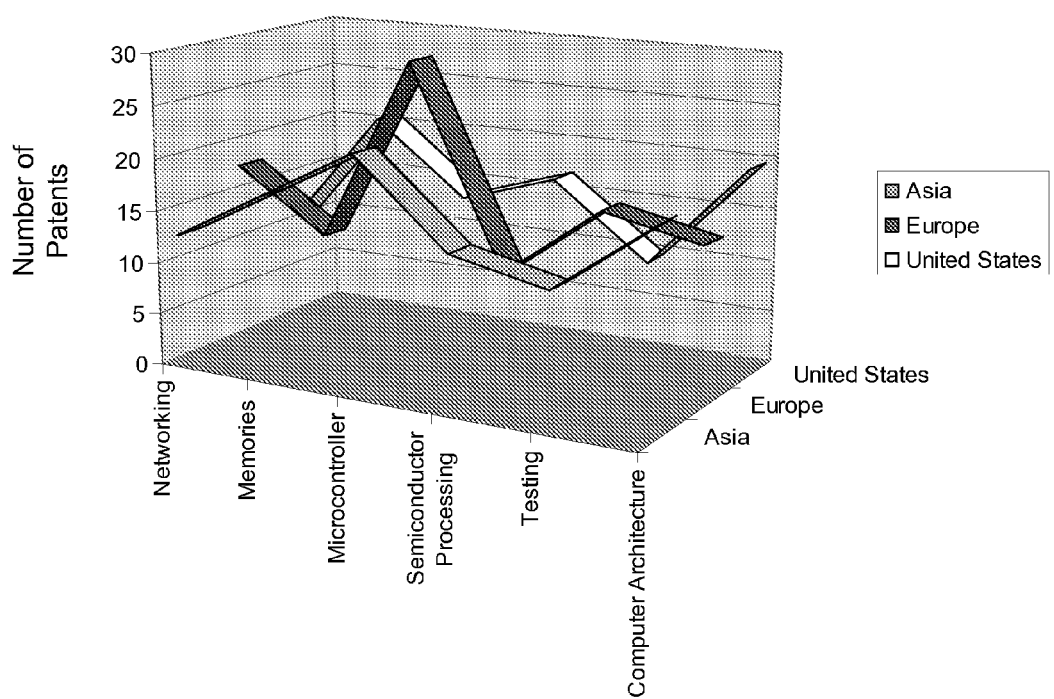
FIG. 4 shows a graphical output of an optimal patent strategy in accordance with one embodiment of the invention.

When the terminating condition is satisfied, the results are reported at step 220. The results may be displayed by using any type of user interface, including a graphical display or textual report. By way of example, a graphical output of an optimal patent strategy in accordance to one embodiment of the invention is shown in FIG. 4. In one embodiment, a three-dimensional graph is plotted to show the number of patents to be filed for specified technology areas and countries, in accordance with an optimal patent portfolio solution produced by the search module. FIG. 5 shows another example of how the results can be displayed. The results can be displayed in tabulated textual form. Quality indicators can also be displayed along with the results. For example, the projected revenue, projected costs, risk and diversity indicators, can also be computed from the results and displayed. Other types of output are also useful.

The optimal patent portfolio can be used in a variety of ways. For example, it can be compared with the original patent portfolio the company currently owns to provide informed recommendations for IP portfolio management. It can be used to assist IP professionals in making strategic IP decisions, such as decisions with respect to patent application filing and investment in research and development in different technological and geographical areas.

Figure 6:
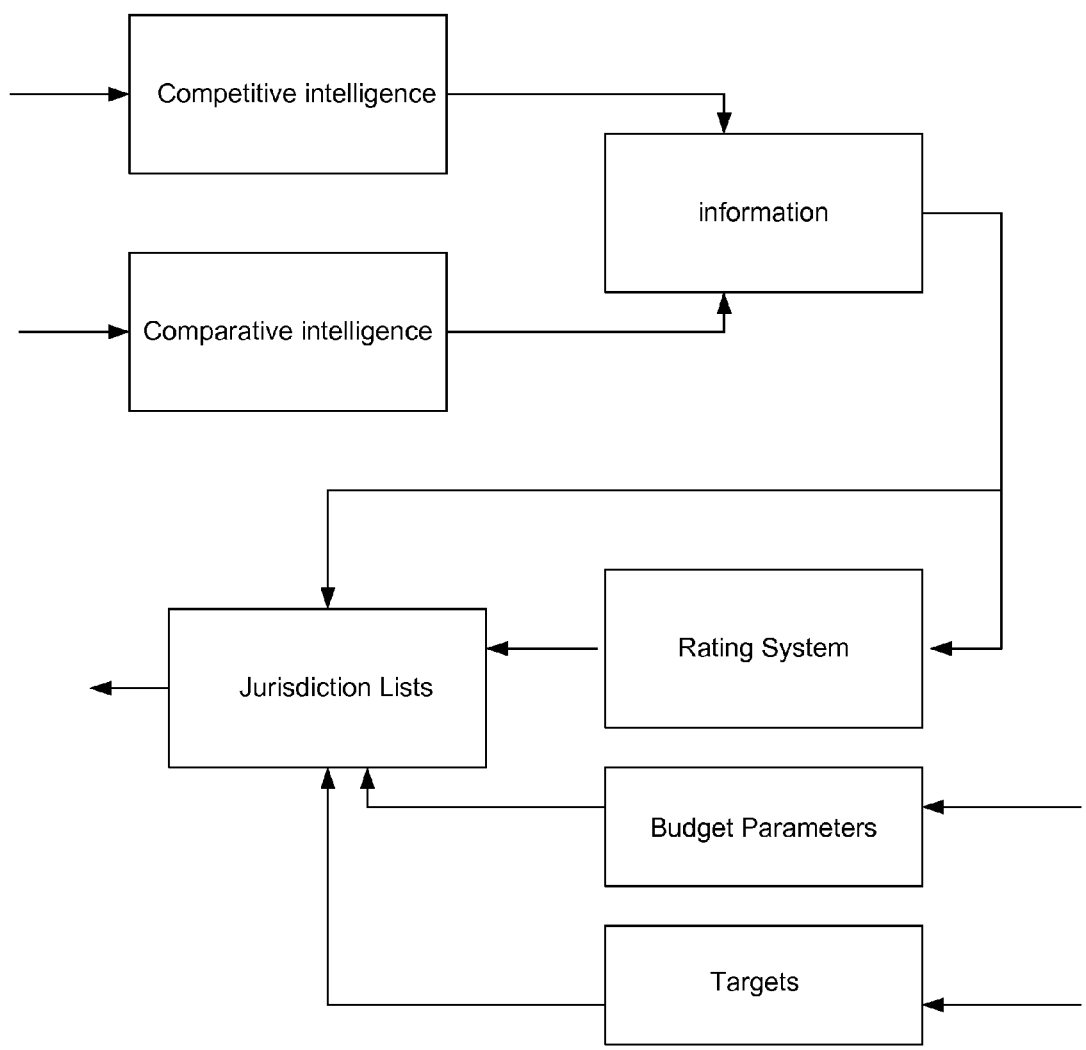
FIG. 6 shows a computer-implemented method for managing IP in accordance with one embodiment of the invention.

A method for producing a patent strategy output, such as a jurisdiction list, in accordance with another embodiment of the invention, is shown in FIG. 6. Referring to FIG. 7, a list of information or data for managing IP in accordance with one embodiment of the invention is provided.

The present invention may be implemented with any combination of hardware and software. For example, one or more implementations, as described herein, may be described in the general context of computer-executable instructions, such as program modules, executed by one or more computers or other devices. The computer-executable instructions may be stored on some form of computer readable media, a computer program product or any other article of manufacture. The article of manufacture can be included as part of a computer system or sold separately.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A method for managing a portfolio of intellectual property (IP) assets comprising:

generating an initial population of genomes that represents a set of possible solutions, wherein a genome comprises a plurality of genes and represents a portfolio of IP assets;

searching, within the population, for at least one genome representing an optimal IP portfolio solution that optimizes at least one strategic goal by modifying the population using a genetic algorithm until a terminating condition is satisfied; and automatically generating at least one recommendation for future actions based on the optimal IP portfolio solution.

2. The method of claim 1 wherein the genetic algorithm comprises:

determining fitness values of the genomes by applying at least one objective fitness function to the genomes, the objective fitness function corresponds to a goal and a fitness value represents the degree to which the strategic goal is satisfied;

selecting parent genomes for reproduction based on their fitness values;

deriving new child genomes from the parent genomes; and replacing the parent genomes with the child genomes in the population.

3. The method of claim 1 wherein the IP assets comprise patents, patent applications, trademarks, service marks, industrial designs, trade secrets, copyrights, licenses or domain names.

4. The method of claim 1 wherein the goal comprises maximizing number of patents that can be procured with a specified budget.

5. The method of claim 1 wherein the goal comprises maximizing protection in core technological areas.

6. The method of claim 1 wherein the goal comprises maximizing growth potential of the IP assets.

7. The method of claim 1 wherein the goal comprises minimizing cost of procuring legal protection for the IP assets.

8. The method of claim 1 wherein the gene represents number of patents filed in a particular market segment.

9. The method of claim 8 wherein the market segment is defined by technology area.

10. The method of claim 8 wherein the market segment is defined by jurisdiction.

11. A method for managing a portfolio of intellectual property (IP) assets, the method comprising:
    receiving, via an input module, user information and analytical data, the user information comprising a plurality of goals;
    searching, via a search module, for an optimal IP portfolio based on the user information and analytical data using an informed search algorithm, wherein the optimal IP portfolio optimizes at least one strategic goal; and
    processing, via the search module, the optimal IP portfolio to automatically generate at least one recommendation for future actions based on the optimal IP portfolio.

12. The method of claim 11 wherein the informed search algorithm comprises an evolutionary algorithm.

13. The method of claim 11 wherein the analytical data comprises cost information and market information.

14. One or more computer readable media comprising computer-executable instructions that, when executed, perform the method as recited in claim 11.

15. The method of claim 11 wherein the informed search algorithm comprises a swarm-based algorithm.

16. The method of claim 11 wherein the goal comprises maximizing number of patents that can be procured with a specified budget.

17. The method of claim 11 wherein the goal comprises maximizing protection of the IP assets in core technological areas.

18. The method of claim 11 wherein the goal comprises maximizing growth potential of the IP assets.

19. The method of claim 11 wherein the goal comprises minimizing cost of procuring legal protection for the IP assets.

20. A system for managing a portfolio of IP assets, comprising:
    an input unit for receiving, processing and storing user information and market information, the user information including a plurality of goals;
    a search unit comprising an informed search algorithm that searches for an optimal IP portfolio that optimizes at least one strategic goal; and
    a presentation device configured for presenting results based on the optimal IP portfolio.

21. The system of claim 20 wherein the input unit further comprises a database server for storing validated analytical data.

22. The system of claim 20 wherein the search algorithm comprises an informed search algorithm.

23. The system of claim 22 wherein the search algorithm comprises an evolutionary algorithm.

24. The system of claim 23 wherein the evolutionary algorithm comprises a genetic algorithm.

25. A system for managing a portfolio of IP assets, the system comprising:
    an input unit configured for receiving user information and market information, the user information including a plurality of goals; and
    a search unit configured to receive the user information and market information from the input module and uses a genetic algorithm to search for an optimal IP portfolio that optimizes at least one strategic goal, the genetic algorithm comprises
    determining fitness values of genomes by applying at least one objective fitness function to the genomes, wherein a genome represents an IP portfolio, the objective fitness function corresponds to a goal and a fitness value represents degree to which the strategic goal is satisfied,
    selecting parent genomes for reproduction based on their fitness values,
    deriving new child genomes from the parent genomes, and
    replacing the parent genomes with the child genomes.

* * * * *